United States Patent [19]

Ohwada et al.

[11] Patent Number: 4,818,077
[45] Date of Patent: Apr. 4, 1989

[54] FERROELECTRIC LIQUID CRYSTAL DEVICE AND METHOD OF DRIVING THE SAME

[75] Inventors: Junichi Ohwada; Katsumi Kondo, both of Hitachi, Japan

[73] Assignee: Hitachi, Ltd., Tokyo, Japan

[21] Appl. No.: 770,204

[22] Filed: Aug. 28, 1985

[30] Foreign Application Priority Data

Sep. 5, 1984 [JP] Japan .................. 59-184646

[51] Int. Cl.$^4$ .................................... G02F 1/13
[52] U.S. Cl. .................... 350/350 S; 350/333
[58] Field of Search ................ 350/333, 339 R, 350 S

[56] References Cited

U.S. PATENT DOCUMENTS

| | | | |
|---|---|---|---|
| 4,062,626 | 12/1977 | Kawakami et al. | 350/333 |
| 4,367,924 | 1/1983 | Clark et al. | 350/334 |
| 4,448,491 | 5/1984 | Okubo | 350/333 X |
| 4,508,429 | 4/1985 | Nagae et al. | 350/333 X |
| 4,529,271 | 7/1985 | Berreman et al. | 350/331 R |
| 4,548,474 | 10/1985 | Nagae et al. | 350/333 |
| 4,548,476 | 10/1985 | Kaneko | 350/333 X |
| 4,655,561 | 4/1987 | Kanbe et al. | 350/350 S |
| 4,725,129 | 2/1988 | Kondo et al. | 350/350 S |

FOREIGN PATENT DOCUMENTS

| | | |
|---|---|---|
| 0092181 | 10/1983 | European Pat. Off. |
| 2054779 | 5/1971 | Fed. Rep. of Germany |
| 2154877 | 6/1972 | Fed. Rep. of Germany |
| 2501114 | 10/1975 | Fed. Rep. of Germany |
| 2521116 | 11/1975 | Fed. Rep. of Germany |
| 2523763 | 12/1976 | Fed. Rep. of Germany |
| 2931392 | 2/1980 | Fed. Rep. of Germany |
| 3414704A1 | 10/1984 | Fed. Rep. of Germany |

Primary Examiner—Stanley D. Miller
Assistant Examiner—Richard F. Gallivan
Attorney, Agent, or Firm—Antonelli, Terry & Wands

[57] ABSTRACT

In a liquid crystal device wherein a bistable ferroelectric liquid crystal is sandwiched between display electrodes; a liquid crystal device and a driving method therefor characterized in that switching elements are disposed at respective intersection points between a plurality of scanning electrodes and a plurality of signal electrodes, and that at a juncture between said each switching element and one of said display electrodes, a control element is disposed by which when said switching element is off, an absolute value of a crest value of a voltage applied to said ferroelectric liquid crystal is held less than a threshold value ($|V_{th}|$) of said ferroelectric liquid crystal.

14 Claims, 11 Drawing Sheets

FERROELECTRIC LIQUID CRYSTAL DEVICE AND METHOD OF DRIVING THE SAME

BACKGROUND OF THE INVENTION

The present invention relates to liquid crystal devices, and more particularly to a liquid crystal device comprising in combination a switching element and a bistable ferroelectric liquid crystal, as well as a method of driving the same.

Liquid crystal devices are used in a display, an optical shutter, a polariscope, etc. Especially, an active matrix display is a display wherein a display portion is formed with a switching element such as thin-film transistor (TFT), which is overlaid with a substance having electrooptic characteristics such as liquid crystal. It is a system suited to a display for high-definition and large-area use having a large number of scanning lines. In case of forming an active matrix wherein a liquid crystal, such as TN liquid crystal or guest/host liquid crystal, the light transmissivity of which depends upon the effective value of an applied voltage, and a TFT are stacked, a display whose number of scanning lines is large can be formed when the off-resistance $R_{off}$ of the TFT is sufficiently high and the on-resistance $R_{on}$ thereof is sufficiently low and when a time constant based on the current leakage of the liquid crystal itself is sufficiently great. However, a display of favorable characteristics cannot be formed if any of the parameters mentioned above is unsatisfactory.

The drive characteristics of an active matrix display employing a liquid crystal such as TN liquid crystal, the display state of which depends upon the effective value of an applied voltage, have been published by the inventors in Collection of Preliminary Manuscripts of All-Japan Meeting of the Television Society in 1983, pp. 121–122.

In view of the results, when the waveform of a voltage to be applied to a liquid crystal layer is calculated with a parameter being the off-resistance $R_{off}$ of a switching element such as thin-film transistor (TFT), a condition which permits display is $V_s > V_{ns}$ where $V_s$ denotes the effective value of a select voltage, while $V_{ns}$ denotes the effective value of a non-select voltage. It is understood that better display characteristics are attained as the off-resistance of the switching element is higher. In case of employing the TN liquid crystal in the active matrix display, therefore, improvements have been made in the direction of rendering the off-resistance $R_{off}$ of the switching element sufficiently high.

However, there has been known, for example, the phenomenon that the off-resistance of the TFT element lowers under the action of the light of a light source for illuminating the display. For coping with this, it has been proposed to hold the off-resistance $R_{off}$ high by a method for an amorphous silicon TFT, which stacks a metal film for intercepting light to enter a channel portion; a method for a polycrystalline silicon TFT, which changes an element structure; etc. Under the present situation, however, the TFTs cannot be said satisfactory for the characteristics of the switching elements for the active matrices, for such reasons that processes for manufacturing the elements become complicated and that the lowering of the off-resistance $R_{off}$ is inevitable as to intense light.

Ferroelectric liquid crystals having memory capabilities in themselves have been published in Applied Physics Letter, 36(11), pp. 899–901 or Molecular Crystal & Liquid Crystal, Vol 94, pp. 213–234 by N. A. Clark et al.; Japanese patent application laid-open No. 56-107216; etc. However, studies on the applications to actual displays cannot be said sufficient.

SUMMARY OF THE INVENTION

An object of the present invention is to provide a device structure and a driving method thereof for constructing a liquid crystal device having a large number of scanning lines and a large quantity of information by applying a bistable ferroelectric liquid crystal to an active matrix.

The present invention consists in constructing an active matrix liquid-crystal device and a driving method thereof by exploiting memory characteristics found in ferroelectric liquid crystals and also various phenomena experimentally found by the inventors.

The characterizing feature of the liquid crystal device of the present invention for accomplishing the object resides, in a liquid crystal device wherein a bistable ferroelectric liquid crystal is sandwiched between display electrodes, in that switching, elements are disposed at respective intersection points between a plurality of scanning electrodes and a plurality of signal electrodes, and that at a juncture between said each switching element and one of said display electrodes, a control element is disposed by which when said switching element is off, an absolute value of a crest value of a voltage applied to said ferroelectric liquid crystal is held less than a threshold value ($|V_{th}|$) of said ferroelectric liquid crystal.

The first characterizing feature of the liquid crystal device-driving method of the present invention resides, in a method of driving a liquid crystal device wherein a bistable ferroelectric liquid crystal is sandwiched between display electrodes, in that switching elements are disposed at respective intersection points between a plurality of scanning electrodes and a plurality of signal electrodes, that at a juncture between said each switching element and one of said display electrodes, a control element is disposed by which when said switching element is off, an absolute value of a crest value of a voltage applied to said ferroelectric liquid crystal is held less than a threshold value ($|V_{th}|$) of said ferroelectric liquid crystal, that when said switching element is on, a first voltage signal whose crest value has an absolute value less than said threshold value ($|V_{th}|$) is applied to said ferroelectric liquid crystal so as to hold a light transmissive state, and that when said switching element is on, a second voltage signal whose crest value has an absolute value not less than said threshold value ($|V_{th}|$) is applied to said ferroelectric liquid crystal so as to change the light transmissive state.

Figure 17:
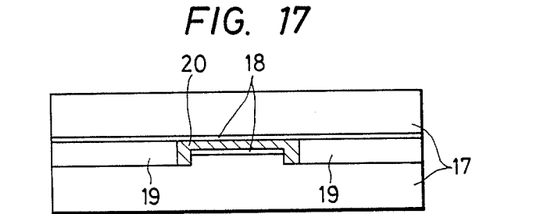
FIG. 17 is a sectional view of a device for a test.

The second characterizing feature of the liquid crystal device-driving method of the present invention resides, in a method of driving a liquid crystal device wherein a bistable ferroelectric liquid crystal is sandwiched between display electrodes, in that switching elements are disposed at respective intersection points between a plurality of scanning electrodes and a plurality of signal electrodes, that at a juncture between said each switching element and one of said display electrodes, a control element is disposed by which when said switching element is off, an absolute value of a crest value of a voltage applied to said ferroelectric liquid crystal is held less than a threshold value ($|V_{th}|$) of said ferroelectric liquid crystal, that when said switching element is on, a first voltage signal whose crest value has an absolute value less than said threshold value ($|V_{th}|$) is applied to said ferroelectric liquid crystal so as to hold a light transmissive state, that when said switching element is on, a second voltage signal whose crest value has an absolute value of predetermined value not less than said threshold value ($|V_{th}|$) is applied to said ferroelectric liquid crystal so as to bring the light transmissive state into a predetermined one, and that after the application of said second voltage signal, a third voltage signal whose crest value has an absolute value not less than said threshold value ($|V_{th}|$) and which is opposite in polarity to said second voltage signal is applied to said ferroelectric liquid crystal so as to change the light transmissive state.

thickness not greater than 2 μm is difficult to be obtained, liquid crystal devices having gaps not greater than 2 μm can be stably fabricated. As the ferroelectric liquid crystal, a mixed material consisting of four ingredients indicated in Table 1 was used. A gap was set at 1.6 μm, and the transparent electrodes 18 were not subjected to any of surface treatments such as coating with an oriented film and rubbing.

TABLE 1

DETAILED DESCRIPTION OF THE PREFERRED EMBODIMENTS

The present invention is based on experimental facts which have been found by the inventors and which will now be described.

First, the construction of an experimental device will be described with reference to FIG. 17.

The liquid crystal device is constructed of two transparent substrates 17 of glass, plastics or the like each having a transparent electrode 18, a PET (polyethylene terephthalate) film spacer 19, and a ferroelectric liquid crystal 20. One of the transparent substrates 17 is etched using photoresist and a solution of fluoric acid, and is provided with a stepped part as shown in FIG. 17. With such stepped part, notwithstanding that a film having a Next, a method of orienting liquid crystal molecules will be explained. First, the liquid crystal was heated to a temperature (about 120° C. in this case) slightly higher than the liquid crystal phase—isotropic phase transition temperature thereof, to once bring it into the isotropic phase. Thereafter, it was cooled gradually at approximately 0.1° C./min., to bring it into the smectic A phase (with the major axes of the molecules being perpendicular to the plane of the layer). At this time, owing to an interface effect at the side of the cell (the interface between the liquid crystal and the spacer film), the liquid crystal grew while the major axes of the molecules were becoming parallel to the interface and the layer was becoming perpendicular thereto. Soon, a favorable mono-domain was formed in a region sufficient for measurements. In the process of growing the mono-domain, the smectic A phase in which the major axes of the molecules and a normal to the layer were perpendicular to each other was formed. However, when the liquid crystal was further cooled gradually to below 54° C., the smectic C* phase in which the major axes of the molecules inclined from the normal of the layer was established while the planeness of the layer was held. By observations to be stated below, it has been confirmed that in the present device, a spiral disappears, while a bistability appears.

Figure 18:
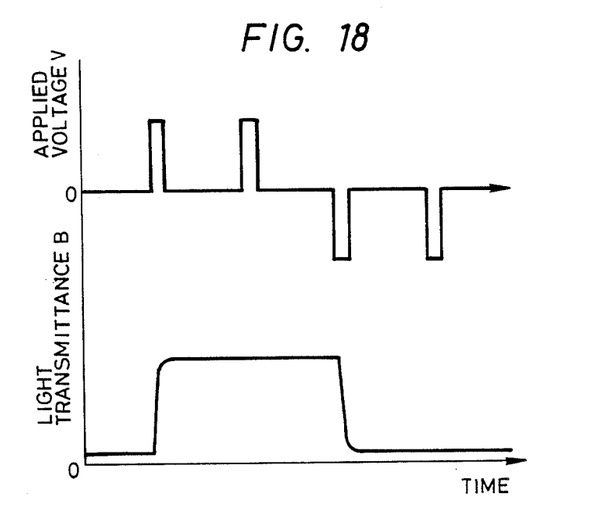
FIGS. 18, 19(a) to 19(c), 20(a) and 20(b), and 21 are fundamental characteristic diagrams of a ferroelectric liquid crystal.

The measured results of the relationship between the waveform of a voltage applied to the device and the light transmissivity (hereinbelow, expressed as 'brightness') of the device will be explained. The measurements of electrooptic characteristics were conducted using a monochromatic light source of a wavelength of 550 nm under polarizing microscope crossed prisms furnished with a light intensity detector, and the temperature of a sample was set at the room temperature of 23° C. Owing to the bistability of the molecular orientation, in this liquid crystal, an electrooptical memory capability appeared (the inventors have confirmed that information is stored for several months or more even after the removal of an electric field), and as illustrated in FIG. 18, bright and dark light-transmissive states reversed for the first time when a pulse opposite in polarity to a pulse applied before was applied. In a case where the polarity of a pulse being an applied voltage to the liquid crystal is the same as that of a pulse applied before, the brightness does not change. In a case where, after the application of a voltage pulse which has a width (intended to mean a time width) and a crest value enough to perfectly reverse the bright and dark light-transmissive states, a voltage pulse equal in width and opposite in polarity (the crest value of which is denoted by $V_{LC}$) is applied, no optical response take place when the absolute value of the value $V_{LC}$ is less than a certain value (including also zero). In the present invention, the threshold voltage at which an optical response begins to take place is defined to be $V_{th}^{(+)}$ for $V_{LC} > 0$ and to be $V_{th}^{(-)}$ for $V_{LC} < 0$. Further, a voltage zone which corresponds to $-V_{th}^{(-)} < V_{LC} < V_{th}^{(+)}$ is defined as the dead zone. When the absolute value $|V_{LC}|$ of the applied voltage to the liquid crystal is rendered at least $V_{th}^{(+)}$ or at least $V_{th}^{(-)}$, the variation rate of the brightness B is greater as the voltage value is larger. However, saturation values $V_{sat}^{(+)}$ and $V_{sat}^{(-)}$ exist for the brightness B, and the voltage dependence disappears at a certain voltage value or above.

Figure 19:
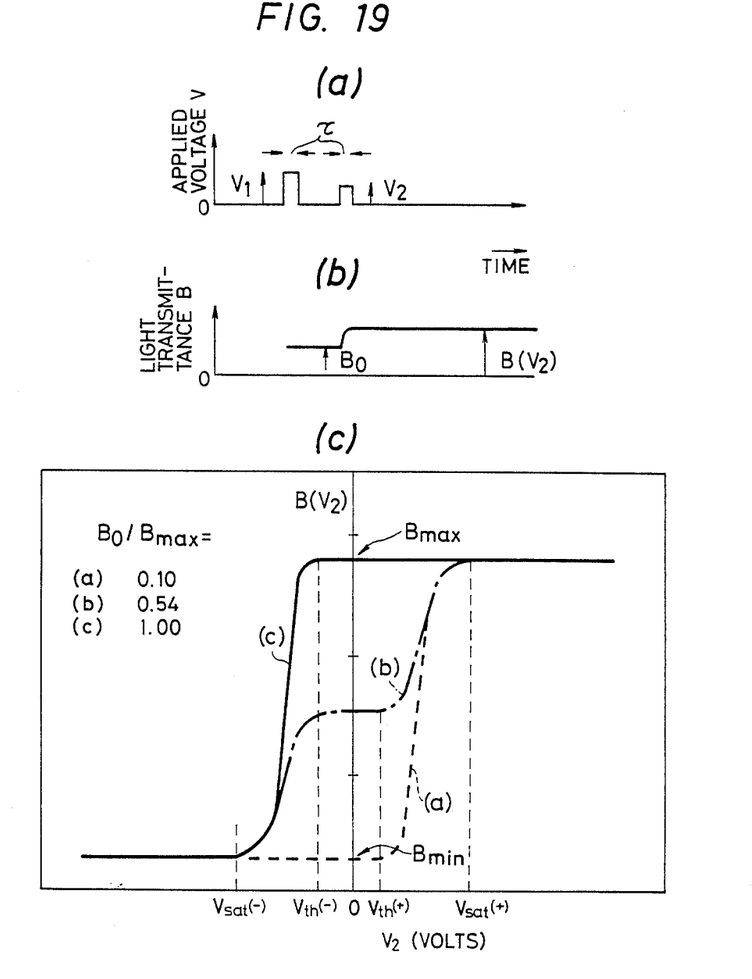

FIG. 19(c) has been obtained from the measurement of brightness (FIG. 19(b) in the case where two voltage pulses shown in FIG. 19(a) were applied. The initial value $B_O$ of the brightness is set by the anterior voltage pulse (a crest value $V_1$) of the applied signals. At this time, if the value $V_1$ is plus and sufficiently large, the initial value $B_O$ of the brightness is the maximum value $B_{max}$ and becomes a characteristic of solid line (c) in the graph (FIG. 19(c)) in which the axis of ordinates represents the second voltage pulse (a crest value $V_2$). In addition, if the value $V_1$ is minus and sufficiently large, the initial value $B_O$ of the brightness is the minimum value $B_{min}$ and the characteristic versus the value $V_2$ becomes as shown by a broken line (a) in FIG. 19(c). Further, if the initial value $B_O$ of the brightness is $B_b$ when the value $V_1$ is any fixed value, the characteristic versus the value $V_2$ becomes as shown by a dot-and-dash line (b) in FIG. 19(c).

The threshold voltages $V_{th}^{(+)}$, $V_{th}^{(-)}$ and the saturation voltages $V_{sat}^{(+)}$, $V_{sat}^{(-)}$ described before are indicated in FIG. 19(c).

In FIG. 19(a), a pulse width $\tau$ is held constant at 1 ms.

The inventors confirmed in the example that both the threshold voltages $V_{th}^{(+)}$ and $V_{th}^{(-)}$ were about 4 V irrespective of the initial states and that the saturation voltages $V_{sat}^{(+)}$ and $V_{sat}^{(-)}$ were about 11 V. The observation was done in a region of approximately $(0.5)^2$ mm$^2$, and the intermediate state of brightness was realized on the ground that large numbers of domains in the two bright and dark states having diameters of approximately several μm—several tens μm coexisted within this region. The electrooptical memory capability as well as the hysteresis corresponding thereto, and the presence of the dead zone, namely, the abrupt threshold characteristics between the values $V_{LC}$ and B have been confirmed by the above experiments. In the present invention, the memory capability and the presence of the dead zone are positively exploited, and the liquid crystal device can function as a display device, an optical shutter device, a polarizer device, etc.

Figure 20:
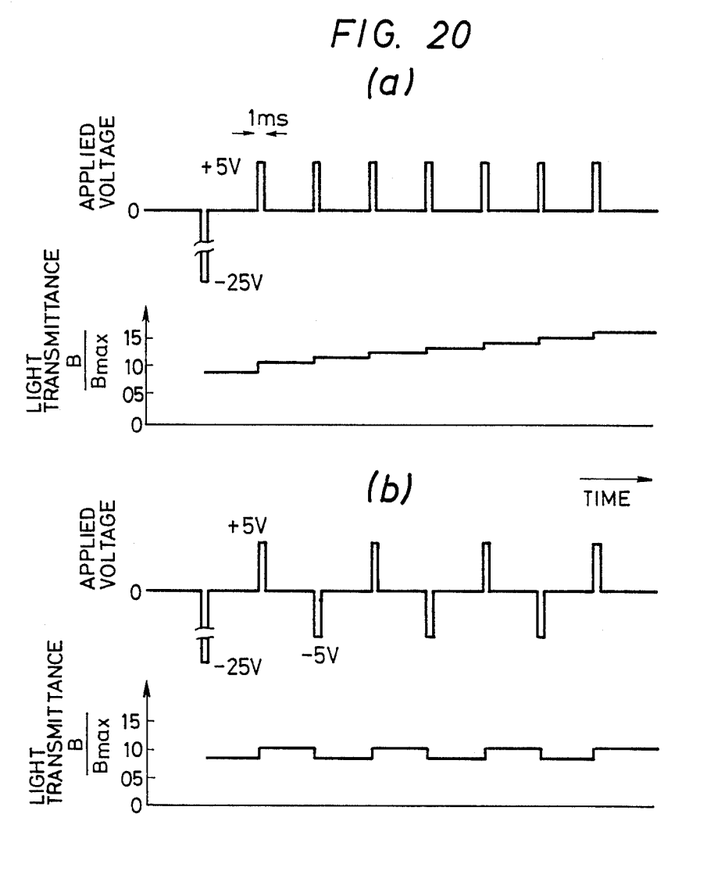
Figure 21:
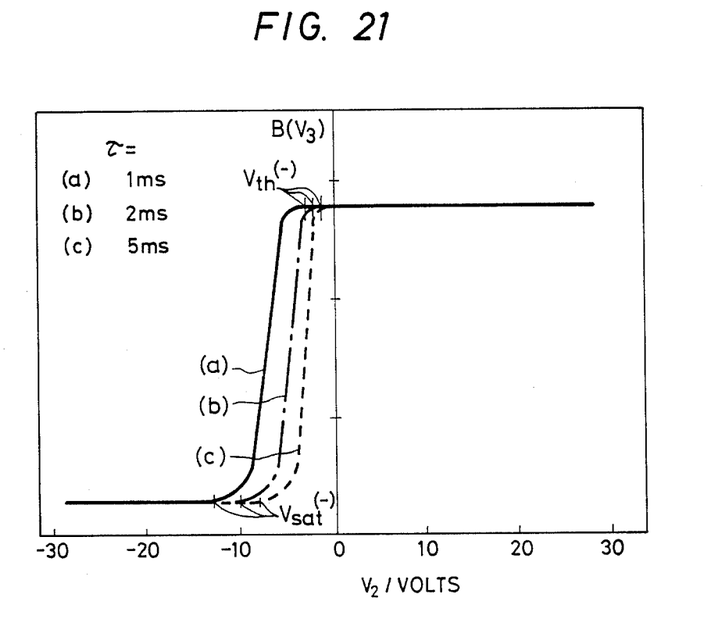

The above is the principal experimental results having led to the present invention, and further two experiments were conducted on supposing a case of active matrix drive. First, the optical response in the case of repeatedly applying a voltage $V_{LC}(\gtrsim V_{th}^{(+)} \approx V_{th}^{(-)}$, and set at 5 V here) slightly exceeding the dead zone was measured. Results are shown in FIGS. 20(a) and 20(b). Here, the brightness is indicated by values normalized with the maximum value $B_{max}$ thereof. As seen from the experimental results, as shown in FIG. 20(a), when pulses of an electrical polarity are repeatedly impressed, variations in brightness are accumulated, whereas as shown in FIG. 20(b), when polarities are successively inverted, no accumulation occurs. These results signify that, in case of applying a voltage to a picture element whose brightness is not to be changed, the value of the voltage needs to be suppressed within the dead zone or that pulses of the identical polarity need to be prevented from being successively impressed when the dead zone is exceeded. In the other experiment, the same relations between voltages and brightness as in FIGS. 20(a) and 20(b) were measured by changing the pulse width $\tau$. An example obtained is shown is FIG. 21. When the pulse width $\tau$ is increased, both $V_{th}^{(-)}$ and $V_{sat}^{(-)}$ lower. Since the result holds for each of three characteristics (a), (b) and (c) in FIG. 21, it is signified that the drive is also possible with the modulation of the pulse width $\tau$.

While the description has thus far been made on the liquid crystal device through which light is transmitted from the rear surface thereof, similar results apply to the so-called reflection type device which is provided with a reflector plate at the rear surface thereof. Besides, they hold true for the so-called guest—host type device in which a coloring matter is mixed in a liquid crystal. In this case, the substrate on the rear side need not be transparent.

Now, an embodiment of a display comprising a ferroelectric liquid crystal and an active matrix in combination will be described with reference to FIG. 1. One picture element is constructed of a three-terminal switching element 1 such as thin-film transistor, a sandwiched ferroelectric liquid crystal layer 2, display electrodes 21 and 22, signal electrode wiring 4, scanning electrode wiring 5, and a control element 3 such as resistor. Such picture elements are disposed at the respective intersection points between a plurality of scanning electrodes and a plurality of signal electrodes, and an active matrix is constructed as a whole. The construction except the control element 3 is the construction of one picture element of an active matrix display having hitherto been known. The control terminal of the three-terminal switching element 1 is connected to the scanning electrode 5, one main terminal thereof to the signal electrode 4, and the other main terminal to one 21 of the display electrodes. The control element 3 is disposed between a potential $V_{cont}$ and the juncture of the other main terminal of the three-terminal switching element 1 and the one 21 of the display electrodes. The display electrode 22 is connected to a potential $V_{com}$. The characterizing feature of the present invention consists in that the control element 3 is added anew and that the control signal $V_{cont}$ is applied to the liquid crystal layer 2 through the control element 3 so as to control the light transmissive state of the liquid crystal. The control signal $V_{cont}$ may be externally applied separately from a scanning voltage $V_{scan}$ or a signal voltage $V_{sig}$, or may well be applied by utilizing the voltage of a certain contact within a display portion.

Here, the role of the control element 3 in FIG. 1 will be explained. The control element 3 functions so that when the switching element 1 is, at least, off, the absolute value of the crest value of a voltage applied to the ferroelectric liquid crystal 2 may be held less than the threshold value ($|V_{th}|$) of the ferroelectric liquid crystal. Since the display state of the ferroelectric liquid crystal layer 2 has the voltage (electric field) dependence and the memory characteristics, the voltage of the liquid crystal layer need not be held even when the switching element 1 is off, unlike the case of the TN liquid crystal. More specifically, when the picture element to be displayed has the scanning voltage applied to the scanning electrode 5 and has the switching element 1 turned on, the signal voltage is applied from the signal electrode 4 to the liquid crystal layer 2 through the switching element 1. If the absolute value of the applied voltage falls outside the dead zone width ($V_{th}(-) \sim V_{th}(+)$), the state of the liquid crystal layer 2 is determined in correspondence with the applied voltage. Thereafter, even when the switching element 1 turns on and any voltage smaller than the threshold voltage ($|V_{th}|$) is applied to the liquid crystal layer 2, the state of the liquid crystal 2 remains unchanged. That is, in the case where the switching element 1 turns on and where the signal voltage greater than the dead zone width is to be written, the control element 3 functions to control the voltage value to be applied to the liquid crystal layer, to be greater than the dead zone width, and in the case where in spite of the switching element 1 being on, the signal voltage smaller than the threshold value ($|V_{th}|$) is to be applied to the liquid crystal 2, and in a case where the switching element is off, the control element 3 functions to control the voltage to be smaller than the dead zone width.

Now, the contents of the present embodiment will be described in conjunction with practicable examples of circuit arrangements. The example of FIG. 2 is such that one end of a resistor 6 of resistance R as the control element 3 is connected to the scanning electrode wiring 5. Herein, letting $R_{on}$ denote the on-resistance of the switching element 1 (in the ensuing description, the switching element shall be assumed a thin-film transistor: TFT) and $R_{off}$ denote the off-resistance, the value R of the resistor 6 is set within a range of $R_{on} < R < R_{off}$. As the control voltage $V_{cont}$ in FIG. 1, the scanning voltage $V_{scan}$ itself is employed.

Figure 2:
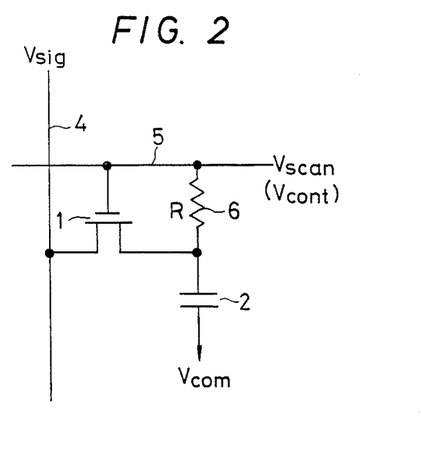
FIGS. 2, 5, 7, 8, 9, 11 and 13 are practicable circuit diagrams of embodiments.
Figure 3:
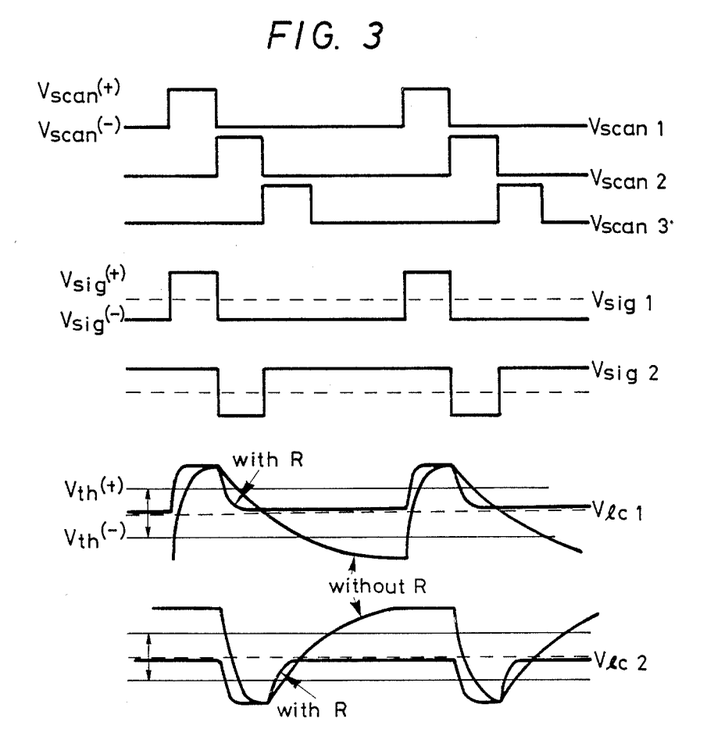
FIGS. 3, 4, 6, 10, 12, 14 and 15 are diagrams showing drive waveforms.

One actual example of the waveforms of voltages applied to the circuit of FIG. 2 is shown in FIG. 3. The waveforms in FIG. 3 are those of two-tone display. $V_{scan1}$, $V_{scan2}$, ... indicate scanning voltages which are applied to the scanning electrodes 5, $V_{sig1}$ a signal voltage which is applied to a selected picture element, $V_{sig2}$ a signal voltage which is applied to a non-selected picture element, $V_{lc1}$ a voltage which is applied to the liquid crystal layer of the selected picture element, and $V_{lc2}$ a voltage which is applied to the liquid crystal layer of the non-selected picture element. Here, for the sake of convenience in the description, the selected picture element is assumed a picture element which has a plus voltage applied to the liquid crystal layer thereof, and the non-selected picture element a picture element which has a minus voltage applied.

The signal voltages $V_{sig1}$ and $V_{sig2}$ in FIG. 3 illustrate the voltage waveforms of the picture elements the applied voltage conditions of which are the severest among the selected picture elements and the non-selected picture elements, respectively. If the display is possible under these conditions, it is possible under any display conditions. In addition, regarding the voltages which are applied to the liquid crystal layers 2, waveforms in the case where the resistors 6 are not connected are simultaneously illustrated in order to examine the effects of the resistors 6 for both the selected and non-selected picture elements.

The voltage levels of the applied waveforms are determined as follows. The high level voltage of the scanning voltage $V_{scan}$ is denoted by $V_{scan}(+)$ and the low level voltage by $V_{scan}(-)$, the high level voltage of the signal voltage $V_{sig}$ is denoted by $V_{sig}(+)$ and the low level voltage by $V_{sig}(-)$, the common electrode (counter electrode) voltage is denoted by $V_{com}$, the on-resistance of the TFT is denoted by $R_{on}$ and off-resistance by $R_{off}$, and the resistance of the resistor 6 is denoted by R. The capacitance of the liquid crystal layer and the respective resistance values are assumed to be so determined that the liquid crystal layer 2 can be sufficiently charged and discharged within a scanning period. It is also assumed for the sake of brevity that the relation of $R_{on} << R << R_{off}$ hold. As this condition, it is the criterion that the value of $R/R_{on}$ or $R_{off}/R_{on}$ is approximately 10 or more. It is not a very severe condition, but it can be readily realized in an ordinary TFT. On this occasion, in the selected picture element, in order that the second voltage signal whose crest value has an absolute value not smaller than the threshold value ($|V_{th}|$) may be applied in the scanning period during which the TFT element 1 turns on, and that the liquid crystal may be held at the first voltage signal whose crest value has an absolute value smaller than the threshold value ($|V_{th}|$), within the non-scanning period during which the TFT element 1 turns off, the following conditions are required:

$$|V_{sig}(+) - V_{com}| > V_{th}(+)$$

$$V_{th}(-) < |V_{scan}(-) - V_{com}| < V_{th}(+)$$

On the other hand, in the non-selected picture element, in order that a minus voltage with respect to the low level $V_{th}(-)$ of the dead zone may be applied in the scanning period during which the TFT element 1 turns on, and that the liquid crystal may be held at a voltage in the dead band, within the non-scanning period during which the TFT element 1 turns off, the following conditions are required:

$$-|V_{sig}(-) - V_{com}| < V_{th}(-)$$

$$V_{th}(-) < |V_{scan}(-) - V_{com}| < V_{th}(+)$$

By establishing such voltage conditions and the respective resistance values as stated before, the voltages which are applied to the liquid crystal can be put into the waveforms $V_{lc1}$ and $V_{lc2}$ in FIG. 3. That is, in the selected picture element, only when the TFT element is on and the picture element and the picture element has been scanned, the voltage exceeds the upper limit of the dead zone, namely, the threshold value $V_{th}(+)$ and the light transmissive state of the liquid crystal changes, so that display information is memorized. When the TFT element 1 is off and the picture element is not scanned, the absolute value of the crest value of the voltage applied to the liquid crystal is held smaller than the threshold value ($|V_{th}|$), so that display information is held. Similarly in the non-selected picture element, only when the TFT element 1 is on and the picture element has been scanned, the voltage below the lower limit of the dead zone, namely, the threshold voltage $V_{th}^{(-)}$ is applied, so that display information is memorized. In contrast, in case of connecting no resistor 6, the voltage of the liquid crystal device exceeds the dead zone in the period in which the picture element is not selected, on account of a leakage current having passed through the off-resistance $R_{off}$ of the TFT element 1. It is understood that the light transmissive state changes and that display information cannot be held.

While the above analysis has been made under the assumption of $R_{on} < < R < < R_{off}$, the drive is possible in such a way that the resistor 6 is determined so as to establish the condition of $R_{on} < R < R_{off}$ and that voltages to be applied to the liquid crystal layer on the basis of the division of the respective resistances are calculated.

When, as in the present embodiment, the resistor 6 is added and the ferroelectric liquid crystal and the active matrix are combined, characteristics required of the switching element are sharply alleviated. In a conventional active matrix, the on-resistance $R_{on}$ of a switching element determining the period of time of writing onto a liquid crystal layer and the off-resistance $R_{off}$ of the switching element for holding the voltage of the liquid crystal layer have required respective absolute values, and the ratio between $R_{on}$ and $R_{off}$ (on/off ratio), $R_{off}/R_{on}$ has required a value of $10^4$ or more with increase in the number of display picture elements. In contrast, in the embodiment of the present invention, the factor of determining the applied voltage is the relation of $R_{on}$, $R_{off}$ and R, and R may be formed in conformity with the resistances $R_{on}$ and $R_{off}$ of the switching element such as TFT. Further, since the voltage of the liquid crystal layer is determined by the division ratio of these resistances, the ratio of $R_{off}/R_{on}$ need not be set very great. Besides, it is dispensed with to form a storage capacitor which has heretofore been formed for holding the voltage of the liquid crystal layer. In this manner, the present invention is effective for forming the active matrix.

Figure 4:
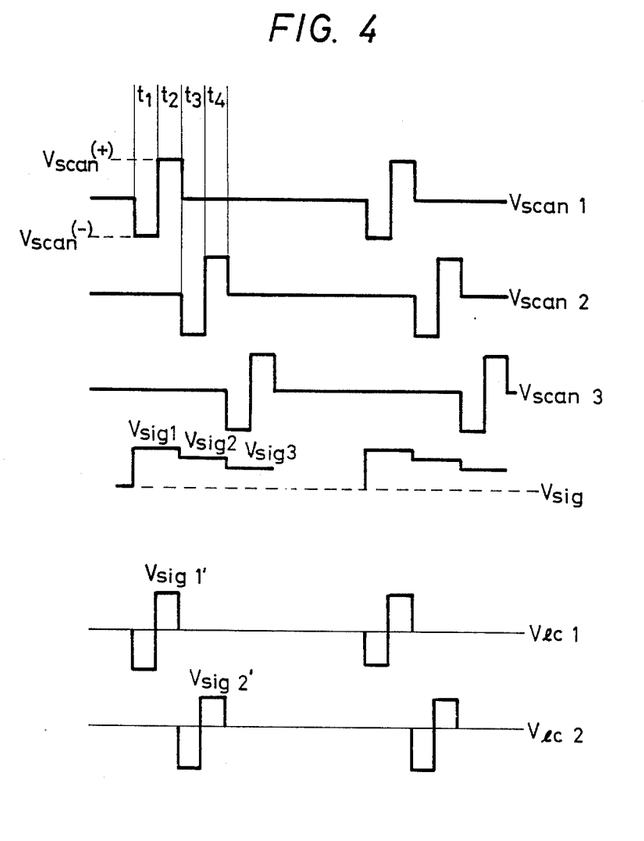

Next, an embodiment of drive waveforms in the case of performing half-tone display with the circuit arrangement of FIG. 2 is illustrated in FIG. 4. In view of the characteristics of the ferroelectric liquid crystal, attention must be paid to the following point in order to realize the half-tone display. By impressing a voltage pulse $V_p$ which is, for example, slightly greater than the upper limit $V_{th}^{(+)}$ of the dead zone, the light transmissive state of the liquid crystal device is stabilized to an intermediate value, and the display of the half tone can be attained. As already described, however, if the voltage pulse $V_p$ is kept impressed, the phenomenon in which the light transmissive state changes is observed. That is, the ferroelectric liquid crystal exhibits the phenomenon that the state of the voltage pulse before the next pulse is impressed determines the next light transmissive state. Although a drive method positively utilizing this phenomenon is also considered, it is complicated. In the embodiment of FIG. 4, a voltage acting on the liquid crystal layer is once applied so that the light transmissivity of the liquid crystal device may become the least, whereupon a voltage for attaining the required transmissitivity of the half tone is applied. That is, when the switching element is on, the second voltage signal whose crest value has an absolute value not smaller than the threshold value ($|V_{th}|$) [preferably, not smaller than the saturation value ($|V_{sat}|$)] is applied so as to bring the light transmissive state of the liquid crystal layer into the saturated state. Subsequently, the third voltage signal whose crest value has an absolute value not smaller than the threshold value ($|V_{th}|$) and which is opposite in polarity to the second voltage signal is applied to the liquid crystal so as to establish the intermediate state. With this method, since the previous state of the liquid crystal layer is once cleared by the minus pulse, the intermediate state is obtained in correspondence with the magnitude of the signal voltage $V_{sig}$. The detailed operations of this drive method will be explained below. Scanning voltages which are applied to the picture elements of the first row, the picture elements of the second row, . . . are denoted by $V_{scan1}$, $V_{scan2}$, . . . , and a signal voltage which is applied to the signal electrode of a certain column is denoted by $V_{sig}$. The on-resistance of the TFT 1 is denoted by $R_{on}$, and voltage waveforms which are applied to the liquid crystal layer under the assumption that the liquid crystal layer is quickly charged and discharged through the resistor 6, are denoted by $V_{lc1}$ and $V_{lc2}$.

First, during a period $t_1$-in periods $t_1$ and $t_2$ during which the first row is scanned, the scanning voltage $V_{scan1}$ applied is a voltage which is lower than the threshold voltage of the TFT element, so that the TFT element is in the off state (the TFT is supposed to be of the N-channel type), and the source-drain path thereof has the off-resistance $R_{off}$. At this time, a voltage based on the voltages $V_{scan}^{(-)}$ and $V_{sig1}$ and the resistances $R_{off}$ and R is applied to the liquid crystal layer, and the magnitude $V(t_1)$ thereof becomes:

$$V(t_1) = V_{scan}^{(-)} + (V_{sig} - V_{scan}^{(-)}) \cdot R/R + R_{off}$$

Here, assuming that $R_{off}$ be sufficiently greater than R, the second term of the right-hand side becomes $\simeq 0$, and $V(t_1) \simeq V_{scan}^{(-)}$ holds. By setting $V_{scan}^{(-)}$ at a value smaller than the lower limit of the dead zone of the ferroelectric liquid crystal, namely, than the threshold value $V_{th}^{(-)}$, the liquid crystal is cleared to a minus value in the period $t_1$. Subsequently, during the period $t_2$, the scanning voltage $V_{scan}^{(+)}$ greater than the threshold voltage $V_{th}$ of the TFT element is applied, so that the TFT element falls into the on state, and the source-drain path comes to have the resistance $R_{on}$. At this time, the voltage $V(t_2)$ which is applied to the liquid crystal layer becomes:

$$V(t_2) = V_{scan}^{(+)} + (V_{sig} - V_{scan}^{(+)}) \cdot R/R + R_{on}$$

Assuming that R be sufficiently greater than $R_{on}$, the above expression becomes $V(t_2) \simeq V_{sig}$, and the signal voltage $V_{sig}$ is applied to the liquid crystal layer. In this manner, the level of the signal voltage $V_{sig}$ is modulated, whereby the gradational display employing the ferroelectric liquid crystal can be realized.

Figure 1:
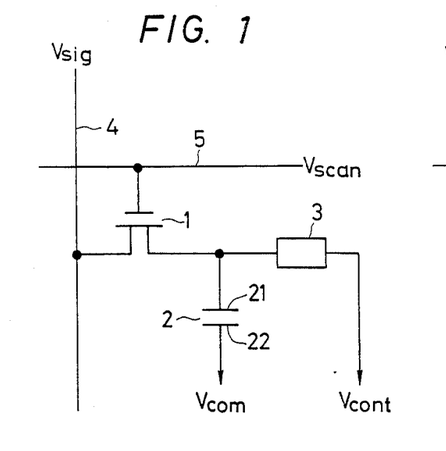
FIG. 1 is a circuit diagram of an embodiment of the present invention.
Figure 5:
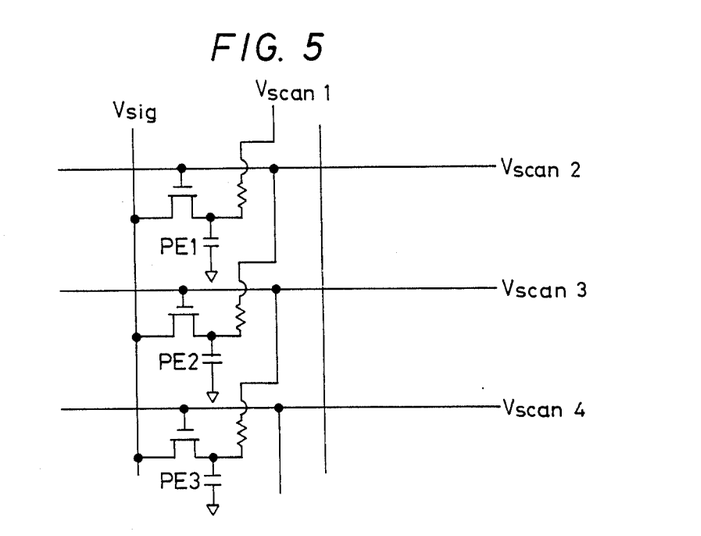
Figure 6:
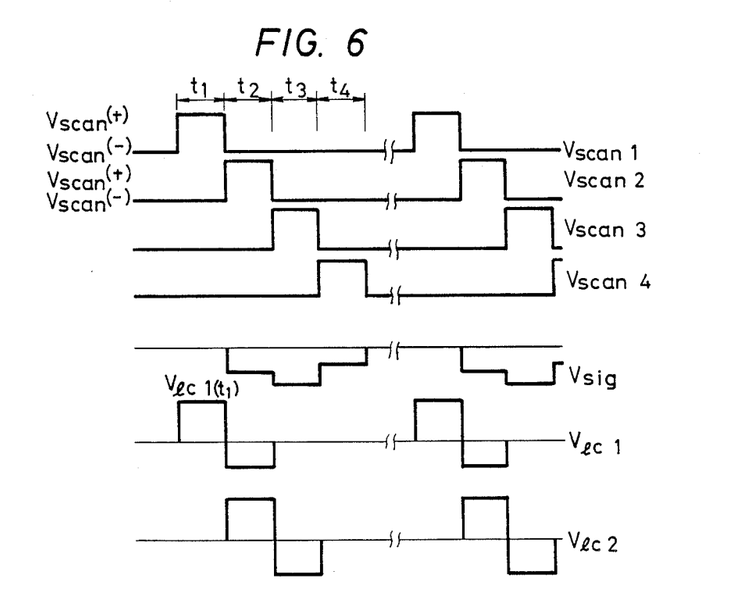

FIG. 5 shows a modified embodiment in which the control voltage $V_{cont}$ in FIG. 1 is the voltage of the scanning electrode of the adjacent picture element. The corresponding drive waveforms are shown in FIG. 6.

Scanning voltages $V_{scan1}$, $V_{scan2}$, $V_{scan3}$, . . . serve both as the scanning voltages of the TFT elements and the control signals $V_{cont}$ of the picture elements of the next line. A signal voltage $V_{sig}$ is a writing voltage of minus potential, and voltages which are applied to the liquid crystal layers of the picture elements PE1, PE2, . . . are denoted by Vhd lc1, $V_{lc2}$, . . . . First, note is taken of the voltage $V_{lc1}$ which is applied to the liquid crystal layer of the picture element PE1. Assuming that the TFTs have the N-channel structure, the voltage $V_{scan2}$ is applied to the TFT of the picture element PE1 during a period $t_1$. Therefore, the potential of the gate electrode is smaller than the threshold voltage $V_{th}$ of the TFT element, to bring the TFT element into the off state, so that the channel portion has the value of a resistance $R_{off}$. For this reason, the voltage $V_{lc1}(t_1)$ which is applied to the liquid crystal layer becomes the division of the voltage $V_{scan1}$ and the signal voltage $V_{sig}$ by the resistance R and the off-resistance $R_{off}$ of the TFT element, and is expressed by:

$$V_{lc1}(t_1) = V_{sig} + (V_{scan}{}^{(+)} - V_{sig}) \cdot R_{off}/R_{off} + R$$

Here, under the condition of $R_{off} >> R$, the above expression becomes $V_{c1}(t_1) \simeq V_{scan}{}^{(+)}$.

In a period $t_2$, the scanning voltage $V_{scan}{}^{(+)}$ is applied to the gate electrode of the TFT of the picture element PE1, to bring the TFT into the on state, so that the channel protion comes to have a resistance $R_{on}$. At this time, the voltage $V_{lc1}(t_2)$ which is applied to the liquid crystal layer becomes:

$$V_{lc1}(t_2) = V_{sig} + (V_{scan}{}^{(-)} - V_{sig}) R_{on}/R_{on} + R$$

and becomes $V_{lc1}(t_2) \simeq V_{sig}$ under the condition of $R >> R_{on}$. That is, assuming time constants to be sufficiently short, the voltages to the liquid crystal layer become as shown at $V_{lc1}$ and $V_{lc2}$ in FIG. 6. Here, the scanning voltages $V_{scan1}$, $V_{scan2}$, . . . are set at a voltage magnitude sufficiently greater than the threshold voltage $V_{th}{}^{(+)}$ of the ferroelectric liquid crystal, whereby the liquid crystal layers are reset to a plus value immediately before the signal voltage is applied thereto. The signal voltage $V_{sig}$ is changed with a value which is somewhat smaller than the threshold voltage $V_{th}{}^{(-)}$, whereby the liquid crystal layer can be controlled in the intermediate state, and the half-tone display is permitted. In this case, the two-tone display is naturally permitted by setting the signal voltage to an amplitude sufficiently greater than the dead zone.

Figure 7:
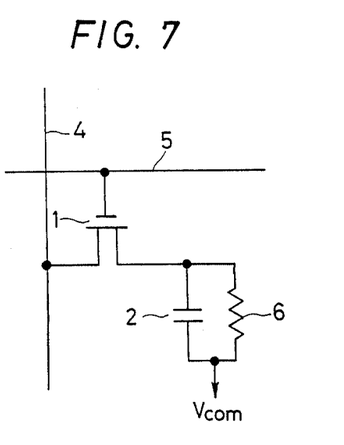

FIG. 7 shows a structure in which, in the embodiment of FIG. 1, the element 3 is a resistor 6 and the control signal $V_{cont}$ is the common electrode voltage $V_{com}$. In this case, effects similar to those of the foregoing embodiments are attained.

Figure 8:
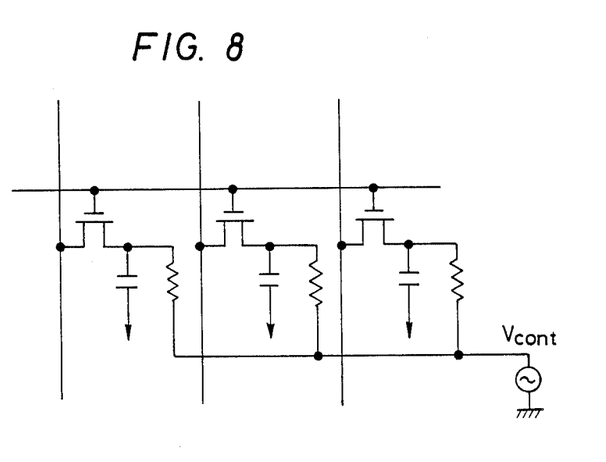

While the structure in which the control signal $V_{cont}$ serves also as the certain voltage within the picture element has thus far been described, the control signal may well be connected to a quite separate signal source as shown in FIG. 8.

The foregoing embodiments have been described as to the example which employs the resistor as the element for controlling the voltage of the liquid crystal layer. As this element, any of various elements different from the resistor can be used.

Figure 9:
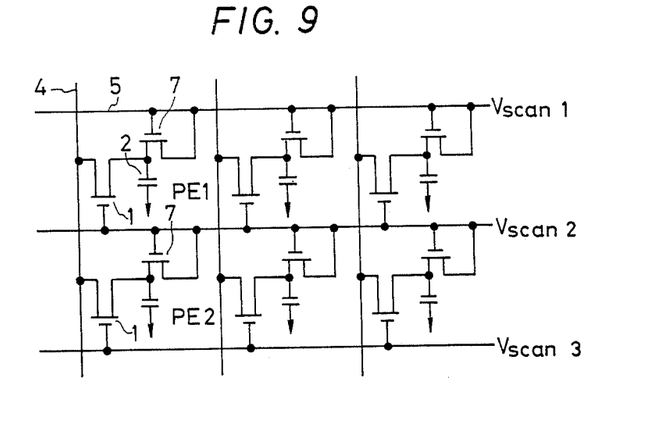

FIG. 9 shows an example which employs a TFT element 7 as an element for controlling the voltage of the ferroelectric liquid crystal layer 2. This embodiment illustrates a circuit arrangement in which both the TFT element 1 and the TFT element 7 are of the N-channel type.

Figure 10:
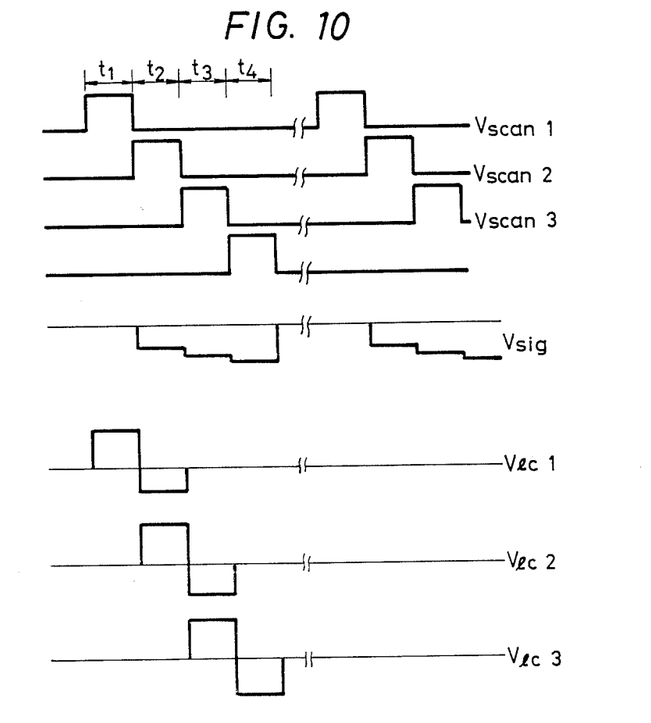

FIG. 10 illustrates a method of driving the circuit in FIG. 9. For example, a scanning voltage $V_{scan2}$ serves simultaneously as the scanning voltage of the TFT element 1 of the picture element PE1, the scanning voltage of the TFT element 7 of the picture element PE2 and the control voltage $V_{cont}$ of the liquid crystal layer of the picture element PE2. In a period $t_1$, the TFT element 7 of the PE1 is brought into the on state by the voltage $V_{scan1}$, while at the same time the voltage $V_{scan1}$ is applied to the liquid crystal layer through the TFT element 7. Next, in a period $t_2$, the TFT element 7 of the picture element PE1 is brought into the off state because the voltage $V_{scan1}$ becomes a low level, and the TFT element 1 is brought into the on state by the voltage $V_{scan2}$. Thus, a signal voltage $V_{sig}$ is applied to the liquid crystal layer through the TFT element 1. Here, the scanning voltages $V_{scan1}$, $V_{scan2}$, . . . are set at a voltage sufficiently greater than the absolute value ($|V_{th}|$) of the threshold voltage of the liquid crystal layer, whereby before the signal voltage is applied to the liquid crystal layer, the voltage of plus value is once applied to reset the state of the liquid crystal layer. Here, both the half-tone display and the two-tone display are permitted by adjusting the voltage level of the signal voltage $V_{sig}$.

In a case where the off-resistance $R_{off}$ of the TFT element is sufficiently high, the signal voltage $V_{sig}$ does not leak from the signal electrode 4, and any unnecessary voltage is not applied to the liquid crystal layer, so that no special problem arises. However, in a case where the off-resistance $R_{off}$ of the TFT element is not sufficient, the TFT elements must be designed for suppressing the leakage of the signal voltage to be small so that $R_{off1} >> R_{off7}$ may hold between the off-resistance $R_{off1}$ of the TFT element 1 and the off-resistance $R_{off7}$ of the TFT element 7. To this end, the configurations of the TFT elements, namely, the channel lengths L and the channel widths W need to be adjusted to make the off-resistances $R_{off}$ unequal. Alternatively, the channel portion of either of the TFT elements may be doped with an impurity by a process such as ion implantation, to change the threshold voltage $V_{th}$ of the TFT element and to change the off-resistance $R_{off}$ at an operating point.

Figure 11:
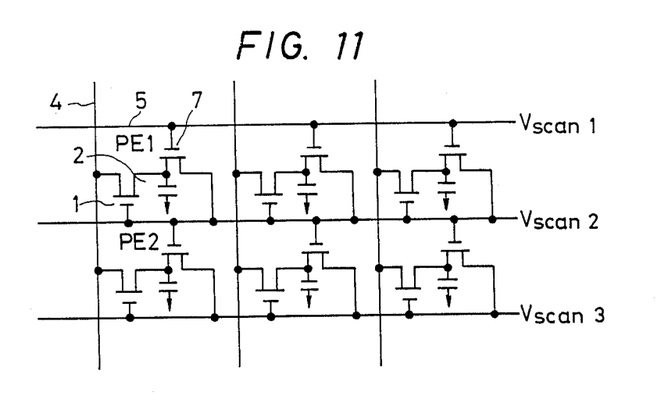
Figure 12:
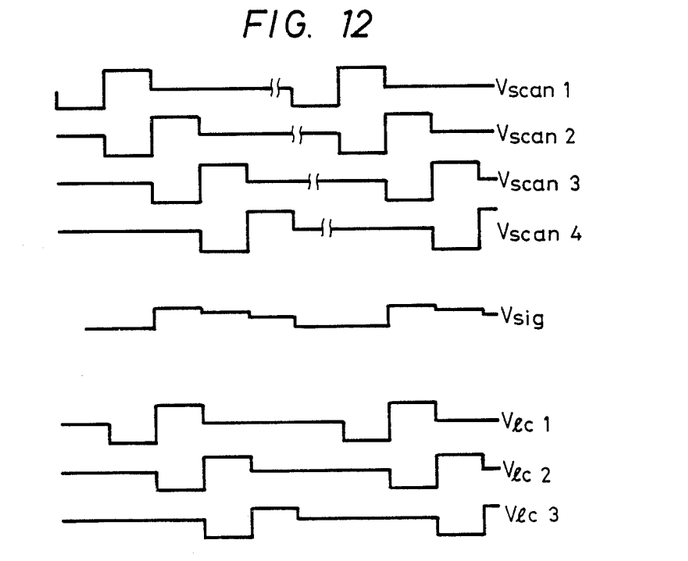

FIG. 11 shows a structure in which a control signal is connected to the scanning electrode of a TFT element 1, and the scanning voltage of a TFT element 7 is connected to the scanning electrodes of picture elements preceding the corresponding picture element by one row (if necessary, by a plurality of rows). A drive method therefor is as shown in FIG. 12. For example, a voltage $V_{scan2}$ has the role of resetting the liquid crystal layer of the picture element PE1 with a minus voltage and the role of scanning the TFT element 1 and bringing it into the on state in the next period.

Figure 13:
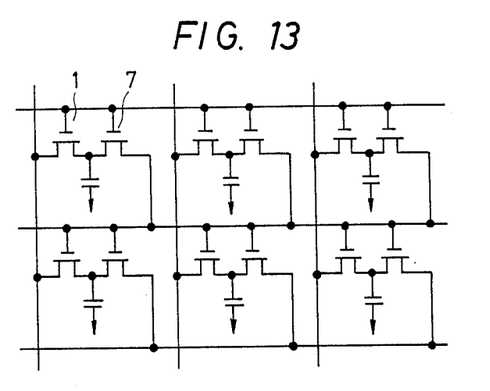
Figure 14:
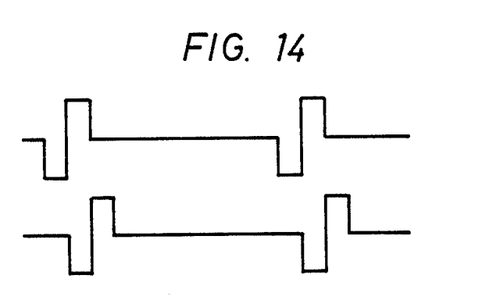
Figure 15:
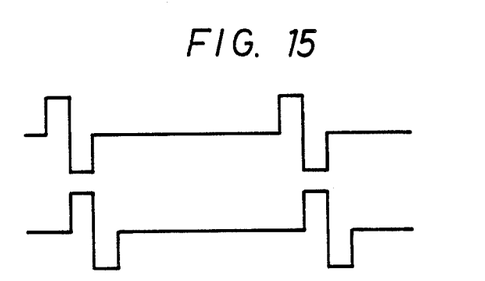

While, in the foregoing embodiments, the two TFT elements formed in each picture element have both been of the N-channel structure, they may well be a TFT of the P-channel structure and a TFT of the N-channel structure combined. FIG. 13 shows an embodiment of a circuit at the time at which the elements of both the channels are combined. The embodiment can operate whether the TFT element 1 and the TFT element 7 are respectively of the N-channel and P-channel, or they are combined reversely. FIG. 14 shows drive waveforms in the case where the TFT element 1 is of the N-channel and the TFT element 7 is of the P-channel, while FIG. 15 shows drive waveforms in the case where the TFT element 1 is of the P-channel and the TFT element 7 is of the N-channel.

Figure 16:
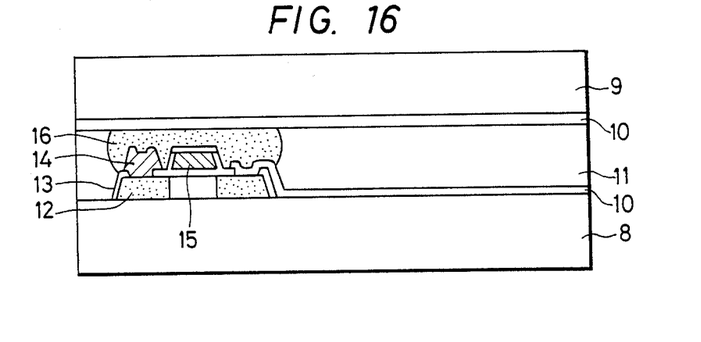
FIG. 16 is a sectional view of an embodiment.

FIG. 16 shows the schematic structure of a partial section in an active matrix display employing a ferroelectric liquid crystal. A substrate 8 was a transparent substrate of, for example, barium borosilicate glass or quartz glass. It was overlaid with a semiconductor thin film 12, such as polycrystalline silicon film or recrystallized silicon film, and an insulator film 13. A gate electrode 15, a drain electrode 14, a transparent electrode 10, etc. were formed by known processes of manufacture. Then, a TFT element was fabricated. Thereafter, a thin film 16 of, for example, an organic substrate was formed on the TFT by spinner coating or the like, and its part outside the TFT portion was removed. A counter glass substrate, in which a glass substrate 9 was formed with a transparent electrode 10, was stacked on the film 16. Owing to such structure, the cell gap is determined by the height of the TFT and the organic coating film 16, and a gap of approximately 2 μm or less can be formed over the whole display portion. Here, the liquid crystal 11 of the ingredients mentioned before is enclosed, and the display with the ferroelectric liquid crystal and the active matrix stacked can be formed.

According to the present invention, the characteristics of a ferroelectric liquid crystal are utilized, and a favorable drive becomes possible even when switching elements of unsatisfactory characteristics such as TFT elements are used.

A liquid crystal layer is previously brought into a saturated state by utilizing a scanning voltage which is applied to the control electrode of a switching element such as TFT element, whereupon an intermediate state is realized by a signal voltage, so that half-tone display of favorable reproducibility is attained.

We claim:

1. In a method of driving a liquid crystal device having a bistable ferroelectric liquid crystal sandwiched between display electrodes, switching elements disposed at respective intersection points between a plurality of scanning electrodes and a plurality of signal electrodes, a control element disposed at a juncture between said each switching element and one of said display electrodes; said method comprising the steps of:
   when said switching element is off, applying to said ferroelectric liquid crystal a voltage having an absolute value of a crest value held to be less than a threshold value ($|V_{th}|$) of said ferroelectric liquid crystal;
   when said switching element is on, applying to said ferroelectric liquid crystal a first voltage signal whose crest value has an absolute value less than said threshold value ($|V_{th}|$) to said ferroelectric liquid crystal so as to hold a light transmissive state; and
   when said switching element is on, applying to said ferroelectric liquid crystal a second voltage signal whose crest value has an absolute value not less than said threshold value ($|V_{th}|$) so as to change the light transmissive state.

2. A method of driving a liquid crystal device as defined in claim 1, characterized in that said second voltage signal is a voltage signal whose crest value has an absolute value not less than a saturation value ($|V_{sat}|$) that substantially nullifies voltage dependence of the light transmissive state.

3. A method of driving a liquid crystal device as defined in claim 1, characterized in that said voltage applied to said ferroelectric liquid crystal has a substantially zero average value.

4. A method of driving a liquid crystal device as defined in claim 1, characterized in that a period of time for which said first voltage signal is applied to said ferroelectric liquid crystal is longer than a period of time during which said second voltage signal is applied to said ferroelectric liquid crystal.

5. A method of driving a liquid crystal device as defined in claim 1, characterized in that said first voltage signal and said second voltage signal are pulse voltage signals.

6. In a method of driving a liquid crystal device wherein a bistable ferroelectric liquid crystal is sandwiched between display electrodes, switching elements disposed at respective intersection points between a plurality of scanning electrodes and a plurality of signal electrodes, a control element disposed at a juncture between said each switching element and one of said display electrodes; said method comprising the steps of:
   when said switching element is off, applying to said ferroelectric liquid crystal a voltage having an absolute value of a crest value held to be less than a threshold value ($|V_{th}|$) of said ferroelectric liquid crystal;
   when said switching element is on, applying to said ferroelectric liquid crystal a first voltage signal whose crest value has an absolute value less than said threshold value ($|V_{th}|$) so as to hold a light transmissive state;
   when said switching element is on, applying to said ferroelectric liquid crystal a second voltage signal whose crest value has an absolute value of predetermined value not less than said threshold value ($|V_{th}|$) so as to bring the light transmissive state into a predetermined one; and
   applying to said ferroelectric liquid crystal a third voltage signal whose crest value has an absolute value not less than said threshold value ($|V_{th}|$) and which is opposite in polarity to said second voltage signal so as to change the light transmissive state.

7. A method of driving a liquid crystal device as defined in claim 6, characterized in that said second voltage signal is a voltage signal whose crest value has an absolute value not less than a saturation value ($|V_{sat}|$) that substantially nullifies voltage dependence of the light transmissive state.

8. A method of driving a liquid crystal device as defined in claim 6, characterized in that said voltage applied to said ferroelectric liquid crystal has a substantially zero average value.

9. A method of driving a liquid crystal device as defined in claim 6, characterized in that a period of time for which said first voltage signal is applied to said ferroelectric liquid crystal is longer than a period of time during which said second voltage signal and said third voltage signal are applied to said ferroelectric liquid crystal.

10. A method of driving a liquid crystal device as defined in claim 6, characterized in that said first voltage signal, said second voltage signal and said third voltage signal are pulse voltage signals.

11. A liquid crystal device wherein a bistable ferroelectric liquid crystal is sandwiched between display electrodes; a liquid crystal device characterized in that switching elements are disposed at respective intersection points between a plurality of scanning electrodes and a plurality of signal electrodes, and that at a juncture between said each switching element and one of said display electrodes, a control element is disposed by which when said switching element is off, an absolute value of a crest value of a voltage applied to said ferroelectric liquid crystal is held less than a threshold value ($|V_{th}|$) of said ferroelectric liquid crystal said device being further characterized in that said switching element is a three-terminal switching element a control terminal of which is connected to said scanning electrode, one main terminal of which is connected to said signal electrode and the other main terminal of which is connected to one of said display electrodes.

12. A liquid crystal device as defined in claim 11, characterized in that said three-terminal switching element is a thin-film transistor.

13. A liquid crystal device wherein a bistable ferroelectric liquid crystal is sandwiched between display electrodes; switching elements are disposed at respective intersection points between a plurality of scanning electrodes and a plurality of signal electrodes, and that at a juncture between said each switching element and one of said display electrodes, a control element is disposed between a juncture of the corresponding switching element and one of said display electrodes and another of said scanning electrodes connected to the switching element adjoining said corresponding switching element so that when said switching element is off, an absolute value of a crest value of a voltage applied to said ferroelectric liquid crystal is held less than a threshold value ($|V_{th}|$) of said ferroelectric liquid crystal.

14. A liquid crystal device wherein a bistable ferroelectric liquid crystal is sandwiched between display electrodes; a liquid crystal device characterized in that switching elements are disposed at respective intersection points between a plurality of scanning electrodes and a plurality of signal electrodes, and that at a juncture between said each switching element and one of said display electrodes, a control element comprising a three-terminal switching element is disposed so that when said switching element is off, an absolute value of a crest value of a voltage applied to said ferroelectric liquid crystal is held less than a threshold value ($|V_{th}|$) of said ferroelectric liquid crystal.

* * * * *